(12) United States Patent
Iovanna et al.

(10) Patent No.: US 8,644,325 B2
(45) Date of Patent: Feb. 4, 2014

(54) METHOD AND APPARATUS FOR PATH COMPUTATION ELEMENT AND ROUTING CONTROLLER COOPERATION

(75) Inventors: Paola Iovanna, Rome (IT); Giulio Bottari, Leghorn (IT); Annikki Welin, Solna (SE); Francesco Paolucci, Pisa (IT); Filippo Cugini, Fidenza (IT); Piero Castoldi, Parma (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 156 days.

(21) Appl. No.: 13/394,220

(22) PCT Filed: Aug. 23, 2010

(86) PCT No.: PCT/SE2010/050901
§ 371 (c)(1),
(2), (4) Date: Mar. 5, 2012

(87) PCT Pub. No.: WO2011/031207
PCT Pub. Date: Mar. 17, 2011

(65) Prior Publication Data
US 2012/0163390 A1    Jun. 28, 2012

Related U.S. Application Data

(60) Provisional application No. 61/241,537, filed on Sep. 11, 2009.

(51) Int. Cl.
*H04L 12/56* (2011.01)
(52) U.S. Cl.
USPC .......................................... 370/401; 709/238
(58) Field of Classification Search
None
See application file for complete search history.

(56) References Cited

U.S. PATENT DOCUMENTS

| 2005/0152284 | A1 | 7/2005 | Kotha et al. | |
|---|---|---|---|---|
| 2007/0217419 | A1* | 9/2007 | Vasseur | 370/392 |
| 2008/0219272 | A1* | 9/2008 | Novello et al. | 370/401 |
| 2010/0208733 | A1* | 8/2010 | Zhao et al. | 370/390 |
| 2010/0208741 | A1* | 8/2010 | Vasseur | 370/400 |
| 2010/0260177 | A1* | 10/2010 | Wu et al. | 370/389 |

(Continued)

OTHER PUBLICATIONS

Paolucci, F et al. PCE Architecture for OIF E-NNI Multi-Domain Routing Evaluated in a Intra-Domain WSON Scenario. Optical Communication, 2009. 35th European Conference on IEEE. Sep. 20, 2009.

(Continued)

*Primary Examiner* — Hassan Phillips
*Assistant Examiner* — Duc Duong

(57) ABSTRACT

A system, method, and node for a Routing Controller (RC) to obtain from a Path Computation Element (PCE), network resource path metrics across a plurality of domains in a communication network in which each domain includes a plurality of Border Nodes (BNs). The RC sends to the PCE, a first message requesting a first path computation between each pair of BNs. The first message contains a maximum metric-value that a path computation must not exceed for a Path Computation Client (PCC) to consider the path computation acceptable. The RC then sends a second message requesting the PCE to compute a subsequent path computation for each BN pair for which the first path computation did not exceed the maximum metric-value. The second message contains a minimum metric-value that a path metric must exceed for the PCC to consider the path metric acceptable. The RC then receives the computed subsequent path computation.

19 Claims, 8 Drawing Sheets

(56) References Cited

U.S. PATENT DOCUMENTS

2011/0019674 A1* 1/2011 Iovanna et al. ............... 370/392
2011/0286336 A1* 11/2011 Vasseur et al. ............... 370/238
2013/0077493 A1* 3/2013 Aissaoui et al. ............. 370/235

OTHER PUBLICATIONS

Paolucci, F. et al Delay-based bandwidth-aware topology abstraction scheme for OIF E-NNI multi-domain routing, Optical Fiber Communication (OFC). Collocated National Fiber Optic Engineers Conference, 2010 Conference on COFC/NFOEC. Mar. 25, 2010.

Paolucci, F. Delay-Bandwidth-Aware Metric Abstraction Schemes for OIF E-NNI Multidomain Traffic Engineering. Journal of Optical Communications and Networking, vol. 2, No. 10, Sep. 13, 2010.

Wang, et al, PCECP Requirements and Extensions of Alternate Routing for Wavelength Switched Optical Networks. draft-wang-pce-wson-alternate-routing-OO.txt. PCECP Requirements and Extensions of Alternate Routing for Wavelength Switched Optical Networks; Draft-Wang-PCE-WSON-Alternate-Routing-OO,TXT, IETF, Oct. 28, 2008.

Takeda, T et al, Analysis of Inter-Domain Label Switched Path (LSP) Recovery. Internet Engineering Task Force, Request for Comments (RFC) 5298. Aug. 1, 2008.

Farrel. et al. A Path Computation Element (PCE)-Based Architecture Internet Engineering Task Force, Request for Comments (RFC) 4655. Aug. 2006.

Vasseur, et al. Path Computation Element (PCE) Communication Protocol (PCEP). Draft-ietf-pce-16.txt, Internet Engineering Task Force, Oct. 14, 2008.

King, D. et al. Path Computation architectures Overview in Multi-Domain Optical Networks Base on ITU-T ASON and IETF PCE. Network Operations and Management Symposium Workshops, 2008. Apr. 7, 2008.

* cited by examiner

METHOD AND APPARATUS FOR PATH COMPUTATION ELEMENT AND ROUTING CONTROLLER COOPERATION

This application claims the benefit of U.S. Provisional Application No. 61/241,537, filed Sep. 11, 2009, the disclosure of which is fully incorporated herein by reference.

TECHNICAL FIELD

The present invention relates generally to communications networks, and in particular, to a method and apparatus for path computation element and routing controller cooperation.

BACKGROUND

Detailed information about the network resources for all domains of all operators involved in a network is required for service setup. An operator must disclose sufficient information about the operator's network to enable other operators to use it. However, the operator typically desires to keep the real network topology hidden in order to prevent the revelation of business-critical information to competitors.

The hierarchical routing proposed by the Optical Interworking Forum (OIF) is a strong candidate technology to perform multi-domain Traffic Engineering (TE). In OIF External Network-Network Interface (E-NNI) Routing, a Routing Controller (RC) in each domain is responsible for the dissemination of intra-domain routing information.

To support the capabilities and functionalities of an Automatically Switched Optical Network (ASON) as defined by the International Telecommunication Union (ITU-T) and in particular of the hierarchical routing, D. Papadimitriou, RFC5787 "OSPFv2 Routing Protocols Extensions for ASON Routing", March, 2010 defines the required routing extensions of the Generalized Multi-Protocol Label Switching (GMPLS) suite of protocols. The routing extensions include reachability, sub-TLVs, discovery procedures and extensions, and import/export rules.

In "The Application of the Path Computation Element Architecture to the Determination of a Sequence of Domains in MPLS & GMPLS", by D. King and A. Farrel, July 2009 (King), King proposes a Parent Path Computation Element (PCE) mechanism which can exploit the ASON routing architecture to provide paths across subnetworks and to determine end-to-end paths in networks constructed from multiple subnetworks or routing areas. The Parent PCE maintains a Traffic Engineering Database (TED) for its domain. The mechanism for building the parent TED will probably rely heavily on administrative configuration and commercial issues. In models such as ASON, it is possible to consider a separate instance of an Interior Gateway Protocol (IGP) running within the parent domain where the participating protocol speakers are the nodes directly present in that domain and the PCEs (RCs) responsible for each of the Child domains.

However, no details are reported on the way the RCs determine the abstracted intra-domain routing information to disseminate to other domains and the implications that such dissemination imposes during successive path computation requests.

In the OIF abstract link model dissemination discussed in King, an RC advertises the full mesh of virtual links between all Border Node (BN) pairs. Each virtual intra-domain link is described through Open Shortest Path First Traffic Engineering (OSPF-TE) Link State Advertisement (TE-LSA).

FIG. 1 is a simplified block diagram of a system 100 employing an existing multi-domain TE architecture. The network includes an RC 102 and two PCEs per domain. The RC 102 is responsible for intra-domain link advertisement. An I-PCE 104 (or Child PCE) is responsible for intra-domain computations and an E-PCE 106 (or Parent PCE) is responsible for inter-domain (hierarchical) path computations. The I-PCE 104 includes an I-TE Database (I-TED) 108. The E-PCE 106 includes an E-TED 110. The I-PCE 104 and the E-PCE 106 both retrieve TE information through the I-TED and the E-TED listening or through other mechanisms (e.g., from the Network Management System (NMS)).

The RC 102, the I-PCE 104, and the E-PCE 106 cooperate with each other to perform virtual intra-domain link advertisement (asynchronous to the requests) and multi-domain path computations (upon request). To perform virtual intra-domain link advertisement, the RC acts as a Path Computation Client (PCC) and is able to request the I-PCE to perform the path computations having the BN pairs as end-points and the minimum delay as an objective function. By exploiting the current PCE Communication Protocol (PCEP) protocol specifications (RFC5440), the I-PCE returns the computed least cost path for each BN pair.

In addition, the I-PCE returns, for each path, the associated TE metric value, which corresponds to the BN-BN delay, such as $m_{i,j}$ from $BN_i$ to $BN_j$. The $m_{i,j}$ value is then inserted as a TE metric value in the TE LSAs of the $BN_i$-$BN_j$ intra-domain link advertised by RC to other RCs belonging to different domains. According to such information, a PCC belonging to a different domain may request the provisioning of a multi-domain connection traversing the considered domain. In this case, the E-PCE maps the received multi-domain request to an intra-domain request between the identified BNs. The E-PCE then sends a Path Computation Request (PCReq) message to the I-PCE including the required TE attributes (e.g., bandwidth) and the related TE metric (advertised by the RC). This TE metric value is then included as a TE Metric Bound with a B flag activated in the PCEP PCReq Metric Object. Thus, the I-PCE computes a path (e.g., in Wavelength Switched Optical Network (WSON) by retrieving it from a set of pre-computed paths) subject to the advertised delay constraint.

However, this existing architecture of the network 100, which exploits the current PCEP specifications (e.g., PCReq Metric Object, B flag, etc), only allows the RC to retrieve the minimum TE metric value. Thus, the path used for any subsequent connection provisioning is only associated with the advertised minimum value. Because of this limited selection criteria, the overall intra-domain network resource utilization may be significantly degraded.

SUMMARY

The present invention is a method, system, and node for PCE and RC cooperation in support of OIF E-NNI multi-domain routing. The present invention exploits a lightweight PCEP extension having a novel PCEP Flag which enables the implementation of abstraction schemes while improving the blocking probability performance and the stability of the E-NNI routing without significantly affecting the advertised service level.

Thus, in one embodiment, the present invention is directed to a method in a Routing Controller (RC) for obtaining from a Path Computation Element (PCE), network resource path metrics across a plurality of domains in a communication network in which each domain includes a border node (BN). The method begins by the RC sending to the PCE a first message requesting the PCE to determine a first path computation between each pair of BNs in the plurality of domains.

The first message contains a maximum metric-value indicating a maximum bound that a path computation must not exceed for a Path Computation Client (PCC) to consider the path computation acceptable. The RC receives from the PCE, the first path computation between BN pairs that do not exceed the maximum metric-value. The first path computation also has a determined path metric between the BN pairs. The method then continues by sending by the RC to the PCE, a second message requesting the PCE to compute a subsequent path computation for each BN pair for which the first path computation did not exceed the maximum metric-value. The second message contains a minimum metric-value indicating a minimum bound that a path metric must exceed for the PCC to consider the path metric acceptable. The minimum metric-value is based on the determined path metric received in the first path computation. Next, the RC receives from the PCE, the computed subsequent path computation between BN pairs that exceed the minimum metric-value.

In another embodiment, the present invention is directed to a system for providing information across a plurality of domains in a telecommunications network. The system includes a PCE located in the first domain, a RC located in the first domain, a first BN located in the first domain, and a second BN located in the first domain. The RC sends a first message requesting the PCE to determine a first path computation between the first BN and the second BN. The first message contains a maximum metric-value indicating a maximum bound that a path computation must not exceed for a PCC to consider the path computation acceptable. The PCE sends a first path computation between the first BN and the second BN that does not exceed the maximum metric-value in response to the first message. The first path computation also has a determined path metric between the first BN and the second BN. The RC also sends a second message requesting the PCE to compute a subsequent path computation between the first BN and the second BN for which the first path computation does not exceed the maximum metric-value. The second message contains a minimum metric-value indicating a minimum bound that a path metric must exceed for the PCC to consider the path metric acceptable. The minimum metric-value is based on the determined path metric of the received first path computation. The PCE also sends to the RC a second path computation between the first and second BNs that exceeds the minimum metric-value in response to the second message.

In still another embodiment, the present invention is directed to a node providing information across a plurality of domains in a telecommunications network. The node sends a first message requesting the PCE to determine a first path computation between a first BN and a second BN of a first domain. The first message contains a maximum metric-value indicating a maximum bound that a path computation must not exceed for a PCC to consider the path computation acceptable. The node receives a first path computation between the first and second BNs that does not exceed the maximum metric-value in response to the first message. The first path computation has a determined path metric between the first BN and the second BN. The node sends a second message requesting the PCE to compute a subsequent path computation between the first BN and the second BN for which the first path computation does not exceed the maximum metric-value. The second message contains a minimum metric-value indicating a minimum bound that a path metric must exceed for the PCC to consider the path metric acceptable. The minimum metric-value is based on the determined path metric of the received first path computation. In addition, the node receives the computed subsequent path computation between the first and second BNs that exceeds the minimum metric-value.

The present invention provides many advantages over the existing system architecture. The present invention exploits a novel lightweight PCEP extension. This enables a more effective cooperation between the RC and the PCE. In particular, the present invention enables the use of abstraction schemes that improve the blocking probability performance and the stability of the E-NNI routing without significantly affecting the advertised service level and the PCEP communication scalability. The present invention may be implemented in any network context (including WSON) and considering any Inter-domain additive TE metric (including end-to-end delay). The present invention simplifies the RC implementation which can avoid the presence of a specific I-PCE module for E-NNI metric computation.

DETAILED DESCRIPTION

Figure 2:
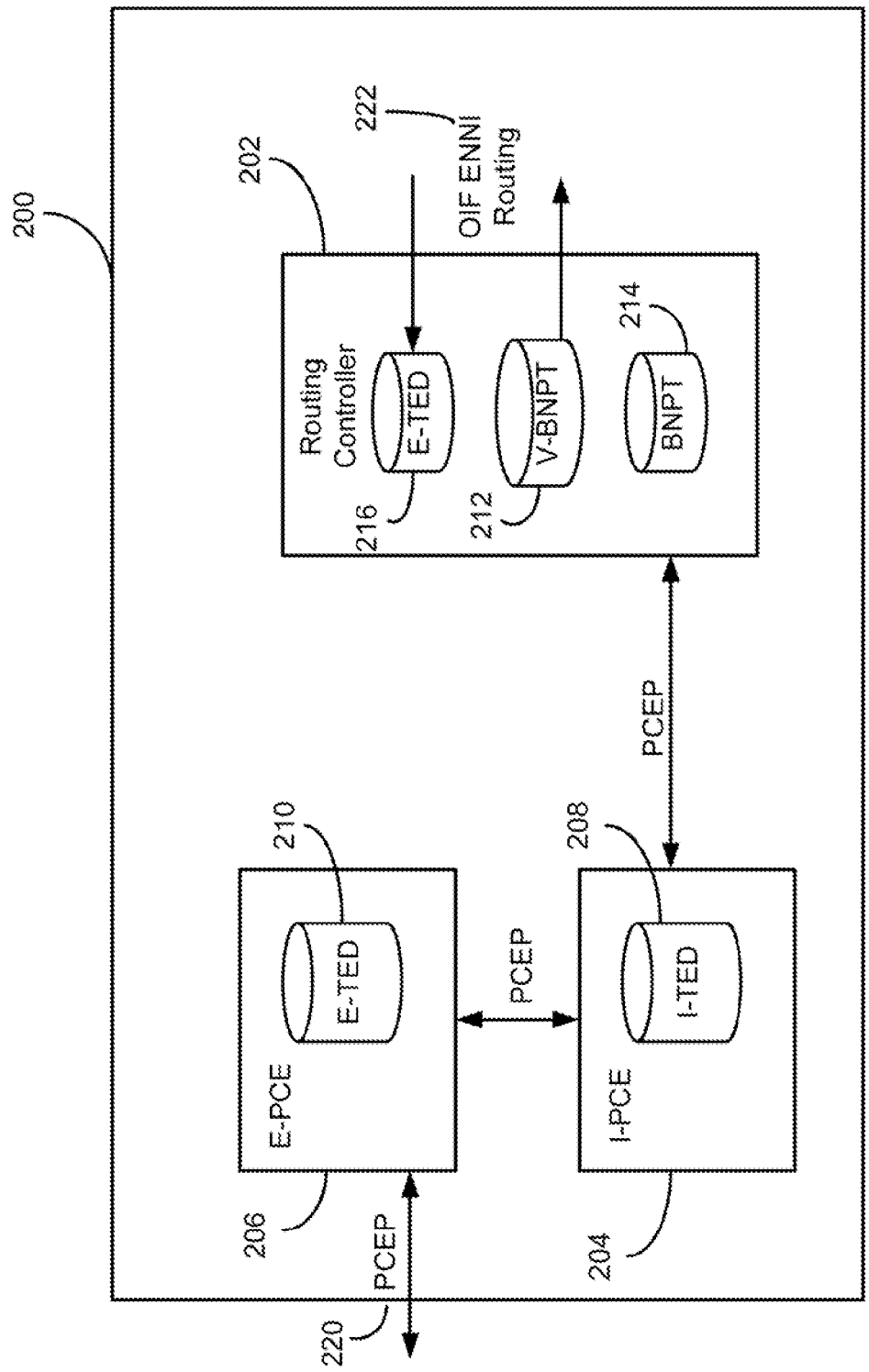
FIG. 2 is a simplified block diagram of a system having an enhanced architecture providing path computation element and routing controller cooperation in an exemplary embodiment of the present invention.

FIG. 2 is a simplified block diagram of a system 200 having an enhanced architecture providing path computation element and routing controller cooperation in an exemplary embodiment of the present invention. The network includes an RC 202 and two PCEs per domain. The RC 202 is responsible for intra-domain link advertisement. An I-PCE 204 (or Child PCE) and an E-PCE 206 (or Parent PCE) are responsible for the intra-domain and (hierarchical) inter-domain path computations, respectively. The I-PCE 204 includes an I-TE Database (TED) 208. The E-PCE 206 includes an E-TED 210. The I-PCE 204 and the E-PCE 206 both retrieve TE information through the I-TED and the E-TED listening or through other mechanisms (e.g., from the Network Management System (NMS)). The RC 202 also includes a Border Node Path Table (BNPT) 212, a Virtual BNPT (V-BNPT) 214, and an E-TED 216. PCE Communication Protocol (PCEP) inter-domain requests are transmitted to and from the E-PCE 206 at 220. Furthermore, Optical Interworking Forum (OIF) External Network-Network Interface (E-NNI) routing information are received by the E-TED 216 and sent through the V-BNPT 214 of the RC 202 at 222.

In this embodiment of the present invention, a new lightweight PCEP extension is utilized which includes a flag called Lower Bound (LB). The LB is introduced within the PCEP Metric Object defined in Request for Comments (RFC) 5440 entitled "Path Computation Element (PCE) Communication Protocol (PCEP)."

Currently, a 1 bit flag called Bound (B) is defined. When set in a Path Computation Request (PCReq) message, the metric-value indicates a bound (a maximum) for the path metric that must not be exceeded for the PCC to consider the computed path as acceptable. The path metric must be less than or equal to the value specified in the metric-value field. When the B flag is cleared, the metric-value field is not used to reflect a bound constraint.

Figure 3:
FIG. 3 illustrates a metric object body format having flags B, C, and LB.

FIG. 3 illustrates a metric object body format for a modified PCReq message 300 having flags B 302, C 304, and LB 306. The format also includes a metric value section 308. The new LB flag is defined as a 1-bit lower bound flag. When set in a PCReq message, the metric-value indicates a minimum bound for the path metric that must be exceeded for the PCC to consider the computed path as acceptable. The path metric must be higher than or equal to the value specified in the metric-value field. When the LB flag is cleared, the metric-value field is not used to reflect a bound constraint. The PCReq message is sent from the PCC (i.e., the RC) to the PCE (i.e., I-PCE).

Figure 4:
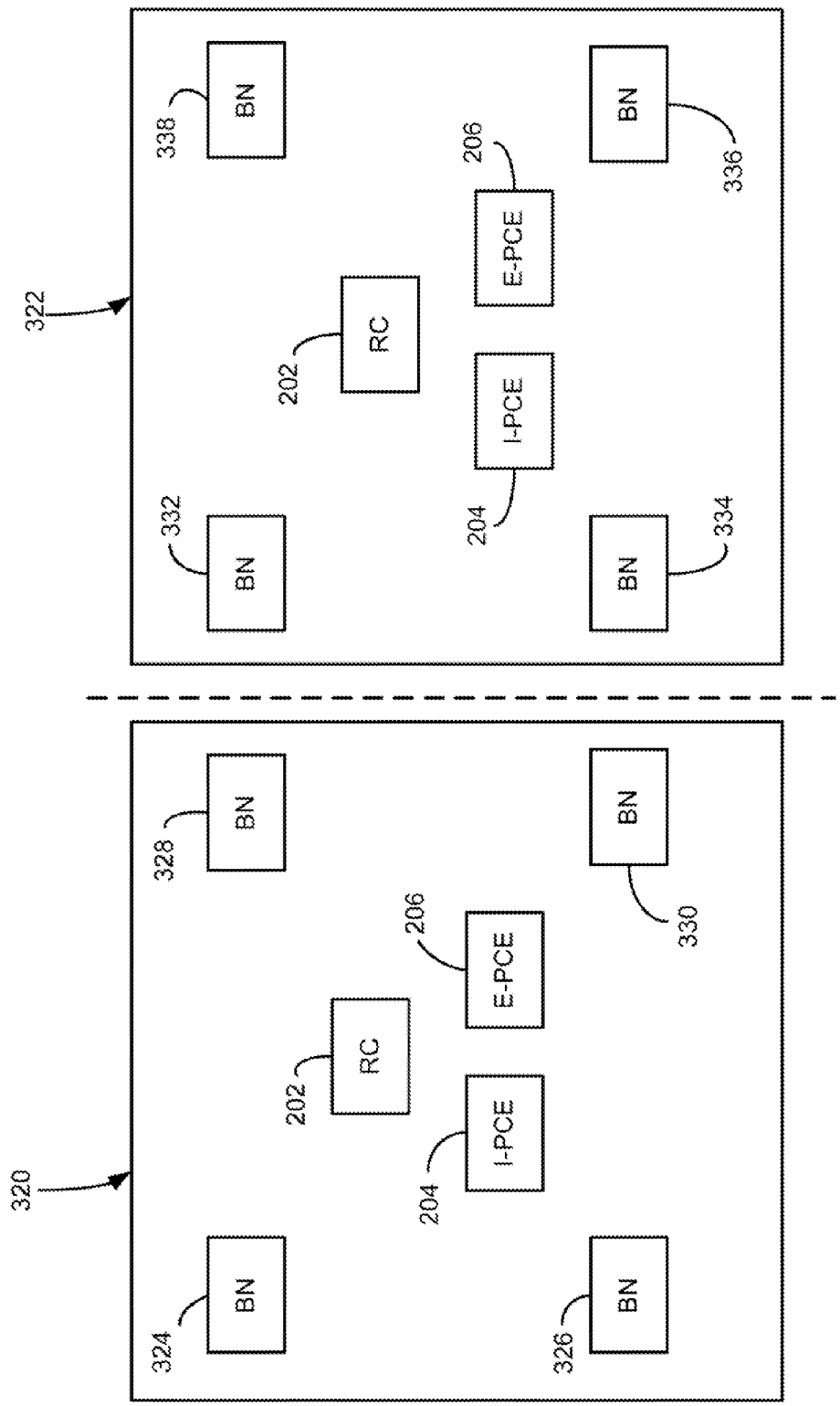
FIG. 4 is a simplified block diagram illustrating two domains in one embodiment of the present invention.

FIG. 4 is a simplified block diagram illustrating two domains 320 and 322 in one embodiment of the present invention. Each domain includes an RC 202, I-PCE 204, and the E-PCE 206, which control a plurality of BNs 324, 326, 328, 330, 332, 334, 336, and 338.

The architecture shown in FIG. 2, in order to define the virtual intra-domain information to be advertised, operates in a specified number of steps (k) corresponding to path computations. With reference to FIGS. 2-4, the operation of the system used in the network 200 will now be explained. In the first step, the RC 202 first requires the I-PCE to perform the path computation between the BN-BN pairs. The obtained metric value is $m_{i,j}(1)$ per $BN_i$-$BN_j$ pair. Next, subsequent path computations are requested by the RC, which require the implementation of several additional steps.

In the existing operation, a single path computation providing a minimum cost path (i.e., the minimum BN-BN delay) is determined. However, in this embodiment of the present invention, additional steps are performed which provide advertised values different than the minimum BN-BN delay since the subsequent computations require a value higher than the one computed at the previous step. A new path computation is triggered to the I-PCE per BN pair. Each PCReq at a current path computation includes a Metric Object (with LB flag activated) having the value $m_{i,j}$ from the previous step returned in a Path Computation Report (PCRep) from the I-PCE of the previous step. In this way, the returned path is the one characterized by the minimum delay excluding the previously received paths. The maximum value of k is defined according to network topology and traffic dynamicity.

The architecture illustrated in FIG. 2 enables the RC to collect a plurality of paths per BN pair which are stored in the BNPT 214. In addition, a further BNPT table, the V-BNPT 212, derived from the BNPT is utilized. The V-BNPT includes, for each BN pair, the virtual information to be flooded through OIF E-NNI routing. Such decoupling allows the separation between the actual intra-domain resources (stored in the BNPT) and the resources advertised to other domains, thus enabling the implementation of abstraction schemes providing full control on the advertised E-NNI parameters and updates.

Figure 5:
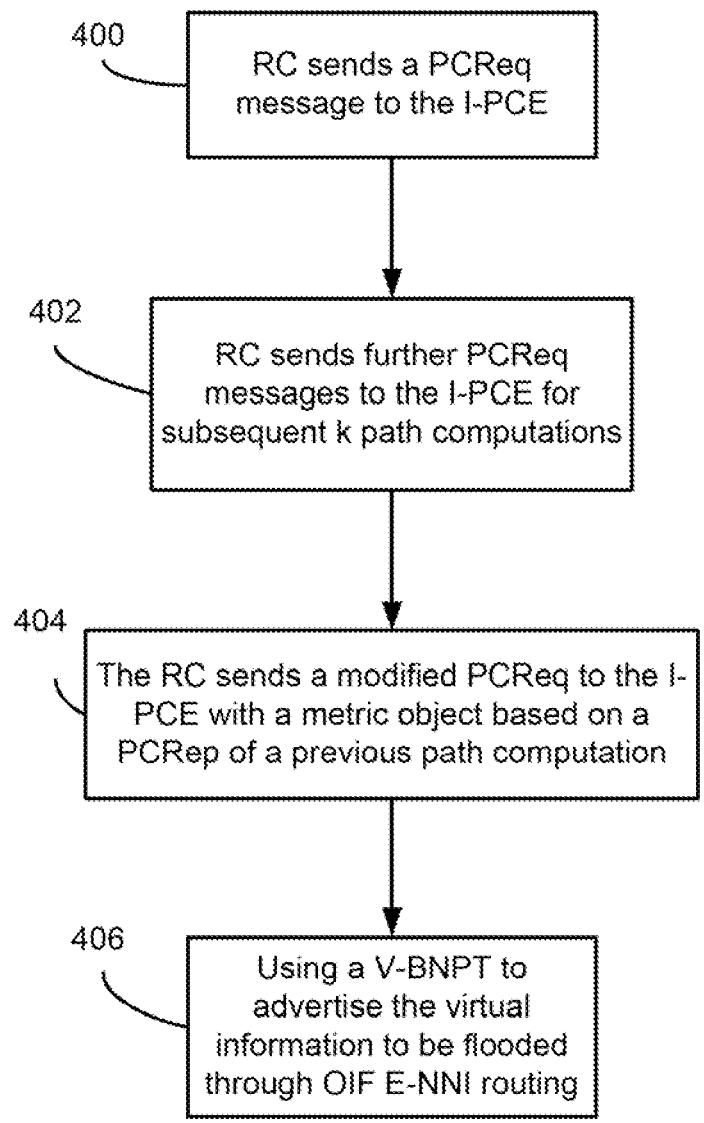
FIG. 5 is a flow chart illustrating the steps of an exemplary embodiment of a method of providing information between a PCE and an RC across multiple domains.

FIG. 5 is a flow chart illustrating the steps of an exemplary embodiment of a method of providing information between a PCE and an RC cooperation across multiple domains. With reference to FIGS. 2-5, the method of path computation element and routing controller cooperation will now be explained. The method begins in step 400, where the RC 202 sends a PCReq message to the I-PCE which requests the I-PCE to perform the path computation between the BN-BN pairs (e.g., BN 326 and BN 330). The obtained metric value is $m_{i,j}(1)$ per $BN_i$-$BN_j$ pair. Next, in step 402, the RC sends further PCReq messages to the I-PCE for subsequent path computations. The method moves to step 404 where a modified PCReq message is sent to the I-PCE where a new path computation is triggered to the I-PCE for each BN pair. Specifically, each PCReq message includes a metric object (with LB flag activated) having a value $m_{i,j}$ calculated in the previous step returned in a Path Computation Report (PCRep) of the previous path computation. In this way, the returned path is the one characterized by the minimum delay excluding the previously received paths. The number of computations, k, is defined according to network topology and traffic dynamicity.

The method illustrated in FIG. 5 enables the RC to collect a plurality of paths per BN pair which are stored in the BNPT 214. The method may optionally implement step 406 where the V-BNPT 212 is utilized to advertise the virtual information to be flooded through OIF E-NNI routing. Such decoupling allows the separation between the actual intra-domain resources (stored in the BNPT) and the resources advertised to other domains, thus enabling the implementation of abstraction schemes providing full control on the advertised E-NNI parameters and updates.

Figure 6:
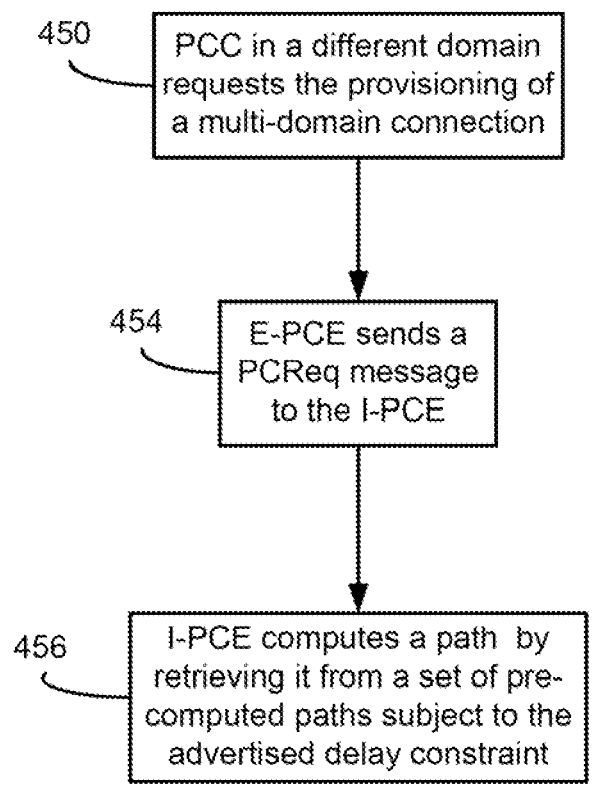
FIG. 6 is a flow chart illustrating the steps of an exemplary embodiment of a method of requesting provisioning of a multi-domain connection according to the teachings of an exemplary embodiment of the method of the present invention.

FIG. 6 is a flow chart illustrating the steps of a method of requesting provisioning of a multi-domain connection according to an exemplary embodiment of the method of the present invention. With reference to FIGS. 2-6, the method will now be explained. The method begins in step 450 where a PCC (e.g., RC 202) in a different domain (e.g., domain 322) requests the provisioning of a multi-domain connection traversing the domain 320. Next, in step 452, the E-PCE 206 maps the received multi-domain request to an intra-domain request between the identified BN. Next, in step 452, the E-PCE sends a PCReq message to the I-PCE 204 which includes the required TE attributes (e.g., bandwidth) and the related TE metric (advertised by the RC 202). This TE metric value is included as a TE metric bound with the B flag activated in the PCEP PCReq metric object. Next, in step 454, I-PCE computes a path (e.g., in WSON) by retrieving it from a set of pre-computed paths subject to the advertised delay constraint (e.g., the value $m_{i,j}$ calculated in a previous step of path computations).

There are several abstraction schemes utilized in the system 200. In one exemplary abstraction scheme, the TE metric value stored and advertised in the V-BNPT is the one associated with the latest path computation. This implies that with more than one path computation, the advertised delay value may be higher than the minimum. However the expected amount of E-NNI updates is decreased and, most important, the I-PCE can exploit not just the optimal path in terms of the end-to-end metric (e.g., delay), but the whole set of paths that guarantee the advertised service level.

Several simulations have been performed to determine the performance of the considered architecture of system 200 in terms of the overall network resource utilization. The performance of the considered PCE-RC architectures and the applied abstraction schemes have been evaluated by means of a custom C++ event-driven simulator. The considered single routing domain consists of a Pan-European WSON network with L=55 links and N=27 nodes. Various scenarios have been evaluated. The performance is evaluated where the considered domain has two adjacent domains, each connected through two BNs (e.g., M=8 inter-domain virtual links, not considering the paths between BNs connected to the same adjacent domain). Lightpath requests are generated following a Poisson process and are uniformly distributed between infra-domain and transit inter-domain requests (inter-domain requests have BNs as end points). Least fill routing is applied among the shortest paths in terms of number of traversed hops (possibly restricted for multi-domain requests to satisfy the advertised TE metric requirements). Wavelength assignment is first set. The BNPT includes more than one intra-domain path per BN pair. In the following example, the values of k=1, 3 and 5 are evaluated.

Figure 1:
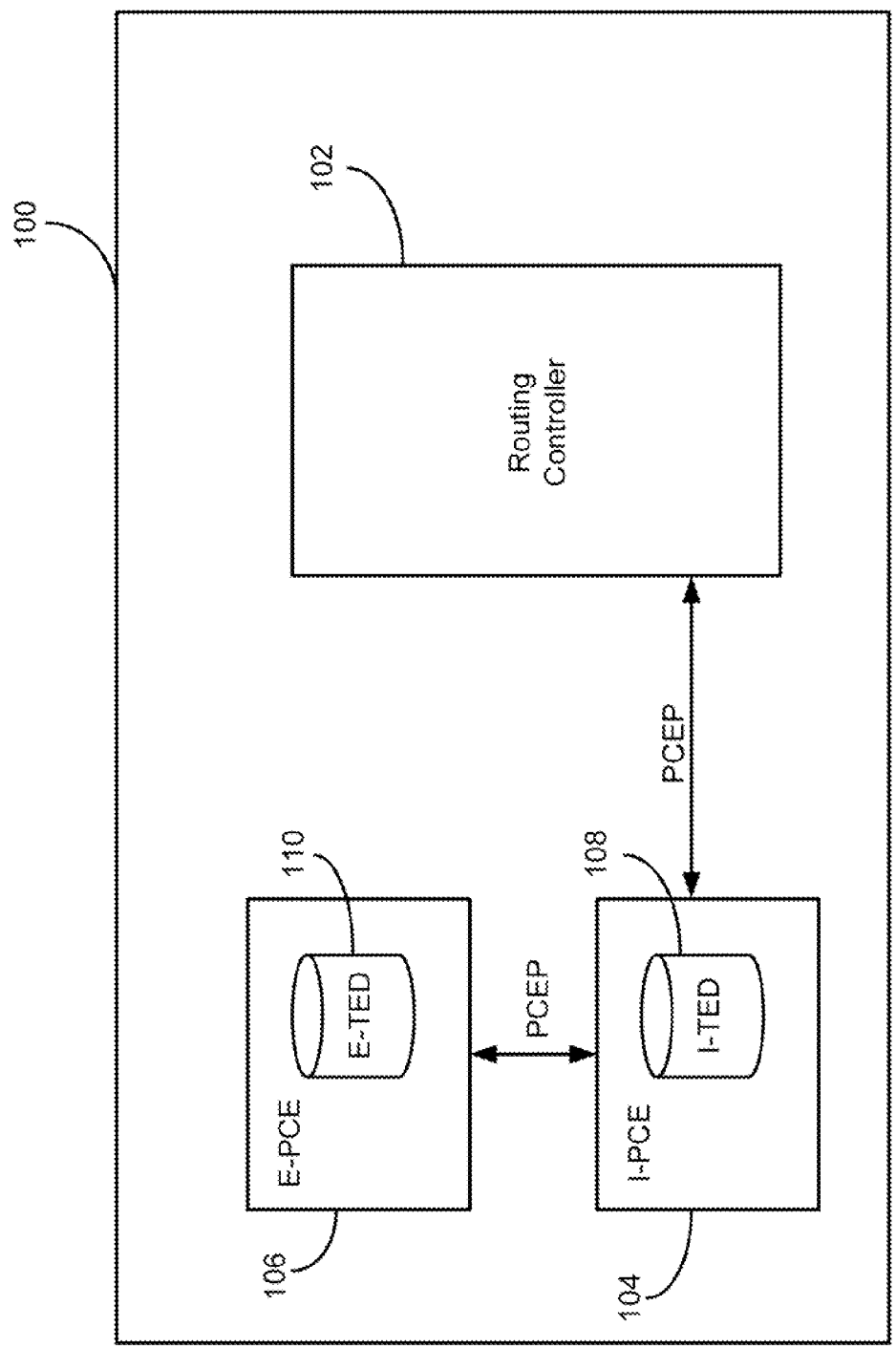
FIG. 1 (prior art) is a simplified block diagram of a system employing an existing multi-domain TE architecture.
Figure 7:
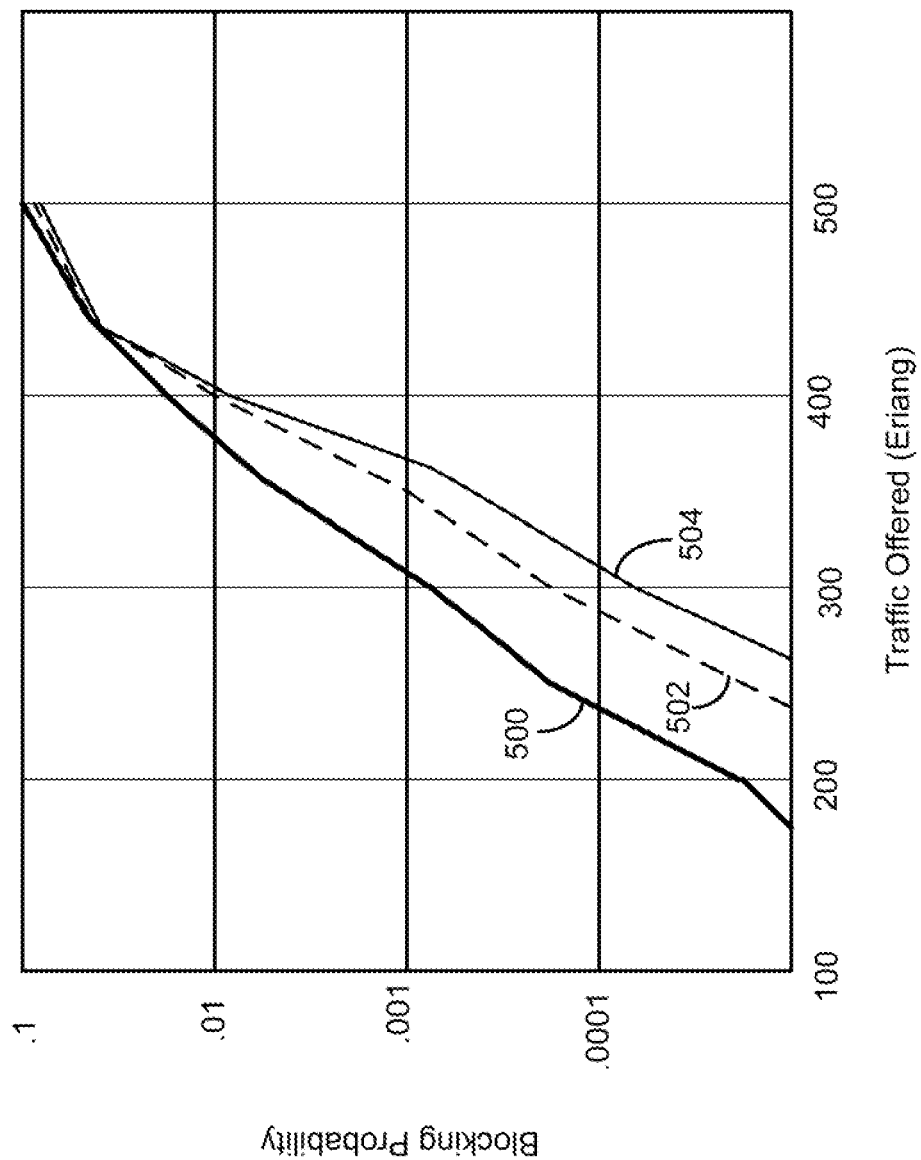
FIG. 7 is a graphical representation of the blocking probability of the exemplary domain.

The value of k=1 (i.e., one path computation) corresponds to the implementation of the architecture of system 100 of FIG. 1, while the values with k>1 refer to the architecture of system 200 of FIG. 2. FIG. 7 is a graphical representation of the blocking probability of the exemplary domain described above. Line 500 illustrates the blocking probability when k equals 1. Line 502 illustrates the blocking probability when k equals 3. Line 504 illustrates the blocking probability when k equals 5. Results show that, by increasing the advertised TE metric, i.e., by considering the metric value of the $k^{th}$ path with k>1, the I-PCE exploits more effectively the least fill routing policy (e.g., by applying load balancing). Results show that with k=3 and k=5, significant improvements are achieved in the overall network resource utilization. For example, at a reasonable load where the Blocking Probability is 0.001, the architecture of system 100 (i.e., k=1) allows to provision 300 Erlang of traffic, while the proposed architecture of system (e.g., k=5) allows to provision around 350 Erlang (+16.7%).

Table 1 below evaluates the counter-effect of the considered abstraction scheme when k>1. The number of paths evaluated for the definition of the advertised TE Metric is V=k·M, where V is the number of paths considered for identifying the advertised TE metric and M is the number of BN-BN pairs (e.g., "M=8 inter-domain virtual links"). In WSON, the V paths are typically pre-computed, thus limited values of k do not affect the PCE and PCEP scalability performance. A parameter η is defined as the ratio between the TE metric value of the minimum cost BN-BN path and the value of the related advertised virtual intra-domain TE metric value (η≤1). Results show that a limited variation is introduced between the advertised information and the actual service level.

TABLE 1

Advertised Service Level Efficiency

|   | k = 1 | k = 3 | k = 5 |
|---|---|---|---|
| V | 8 | 24 | 40 |
| η | 1 | 0.90 | 0.86 |

Figure 8:
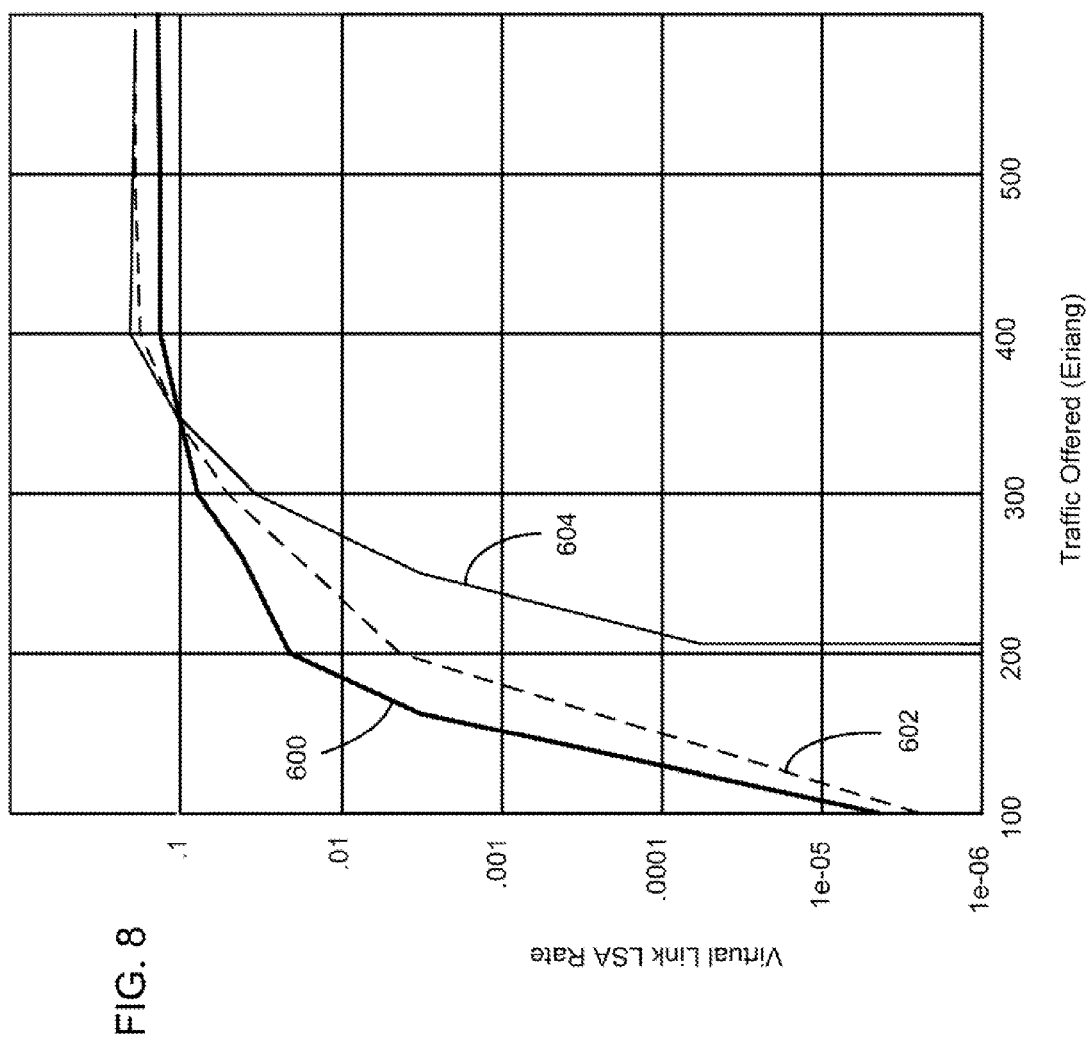
FIG. 8 is a graphical representation of the average amount of TE LSA Updates per virtual intra-domain link advertised by the RC through the hierarchical OIF E-NNI routing.

FIG. 8 is a graphical representation of the average amount of TE LSA Updates per virtual intra-domain link advertised by the RC through the hierarchical OIF E-NNI routing. Each LSA Update is triggered upon every change induced by the abstraction scheme into the virtual inter-domain link attributes stored in the V-BNPT. Line 600 illustrates the virtual link LSA rate where k equals 1. Line 602 illustrates the virtual link LSA rate where k equals 3. Line 504 illustrates the virtual link LSA rate where k equals 5. Results show that significant reduction is achieved by increasing the value of k particularly at reasonable network loads.

In the existing system 100, the TE metric associated with the minimum cost path is distributed and exploited by subsequent requests. This has the advantage that the advertised service level is the best achievable. However, this also implies that every multi-domain request exploits just the resources belonging to the minimum cost path. Such resources are rapidly consumed, resulting in a high blocking probability. In system 200, the RC advertises a slightly worse service level (BN-BN delay) which enables load balancing among multiple paths (and not only a fixed routing along the resources belonging just to the path at minimum delay).

The present invention defines an architecture that disseminates abstracted intra-domain information thereby enabling an effective use of network resources. In one embodiment, the RC disseminates this information. Specifically, the RC advertises the full mesh of virtual intra-domain links between BN pairs. Each virtual intra-domain link is described through OSPF-TE Link State Advertisement (TE-LSA). Each virtual intra-domain link is described through several parameters, including the BN-BN TE metric, which corresponds to the BN-BN delay. The BN-BN delay depends on the computed path. Such internal path computation is performed by the I-PCE on the basis of the intra-domain information retrieved from the Intra-domain TED. The end-to-end path is computed by the E-PCE by considering the inter-domain TED, retrieved by considering the information flooded by all RCs. The RC, I-PCE, and E-PCE cooperate in order to perform virtual intra-domain link advertisement (asynchronous to the requests) and multi-domain path computation (upon request).

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of obtaining network resource path metrics between a plurality of Border Nodes, BNs, in a first domain in a communication network, wherein the method is performed in a Routing Controller, RC, and the path metrics are obtained from a Path Computation Element, PCE, the method being characterized by the steps of:

sending by the RC to the PCE, a first message requesting the PCE to compute a first path computation between each pair of BNs in the first domain, the first message containing a maximum metric-value indicating a maximum bound that a path computation must not exceed for a Path Computation Client, PCC, to consider the path computation acceptable;

receiving by the RC, a first response from the PCE, the first response including a computed first path computation for those BN pairs for which the first path computation does not exceed the maximum metric-value contained in the first message, the first path computation providing a determined path metric between each BN pair;

sending by the RC to the PCE, a second message requesting the PCE to compute a subsequent path computation for each of the BN pairs for which the first path computation did not exceed the maximum metric-value, the second message containing a minimum metric-value indicating a minimum bound that a path metric must exceed for the PCC to consider the path metric acceptable, wherein the minimum metric-value is based on the determined path metric received in the first path computation; and receiving by the RC, a second response from the PCE, the second response including a computed subsequent path computation for those BN pairs for which the subsequent path computation exceeds the minimum metric-value contained in the second message.

2. The method according to claim 1, wherein the determined path metric is the delay calculated between each BN pair.

3. The method according to claim 1, further comprising the step of advertising path computations received by the RC based on the computed subsequent path computation between BN pairs that exceed the minimum metric-value.

4. The method according to claim 3, further comprising storing actual inter-domain resources in a BN Path Table, BNPT.

5. The method according to claim 4, wherein the step of advertising path computations includes using a Virtual BNPT, V-BNPT, of the RC to advertise the path computations to other domains.

6. The method according to claim 1, wherein the first and second messages are Path Computation Request, PCReq, messages using PCE Communication Protocol, PCEP.

7. The method according to claim 1, wherein the receiving steps include receiving a Path Computation Report, PCRep, from the PCE.

8. A system for providing information across a plurality of domains in a telecommunications network, the system comprising:
a Path Computation Element, PCE, located in a first domain;
a Routing Controller, RC, located in the first domain;
a first Border Node, BN, located in the first domain;
a second BN located in the first domain;
wherein the RC includes means for sending a first message requesting the PCE to determine a first path computation between the first BN and the second BN, the first message containing a maximum metric-value indicating a maximum bound that a path computation must not exceed for a Path Computation Client, PCC, to consider the path computation acceptable;
wherein the PCE includes means for sending a first path computation between the first BN and the second BN that does not exceed the maximum metric-value in response to the first message, the first path computation having a determined path metric between the first BN and the second BN;
wherein the RC includes means for sending a second message requesting the PCE to compute a subsequent path computation between the first BN and the second BN for which the first path computation does not exceed the maximum metric-value, the second message containing a minimum metric-value indicating a minimum bound that a path metric must exceed for the PCC to consider the path metric acceptable, wherein the minimum metric-value is based on the determined path metric of the received first path computation; and
wherein the PCE includes means for sending to the RC a second path computation between the first and second BNs that exceeds the minimum metric-value in response to the second message.

9. The system according to claim 8, wherein the determined path metric is the delay calculated between the first BN and the second BN.

10. The system according to claim 8, further comprising a BN Path Table, BNPT, for storing actual inter-domain resources.

11. The system according to claim 8, wherein the RC includes means for advertising path computations based on the computed subsequent path computation between the first and second BNs that exceed the minimum metric-value.

12. The system according to claim 11, wherein the means for advertising path computations includes a Virtual BN Path Table, V-BNPT, to advertise the path computations to other domains.

13. The system according to claim 11, wherein the PCE includes:
means for receiving a request for provisioning a multi-domain connection by a PCC from a second domain; and
means for computing a multi-domain connection based on advertised path computations.

14. A node for providing information across a plurality of domains in a telecommunications network, the node comprising:
means for sending a first message requesting a Path Computation Element, PCE, to compute a first path computation between a first Border Node, BN, and a second BN of a first domain, the first message containing a maximum metric-value indicating a maximum bound that a path computation must not exceed for a Path Computation Client, PCC, to consider the path computation acceptable;
means for receiving a first path computation between the first and second BNs that does not exceed the maximum metric-value in response to the first message, the first path computation having a determined path metric between the first BN and the second BN;
means for sending a second message requesting the PCE to compute a subsequent path computation between the first BN and the second BN for which the first path computation does not exceed the maximum metric-value, the second message containing a minimum metric-value indicating a minimum bound that a path metric must exceed for the PCC to consider the path metric acceptable, wherein the minimum metric-value is based on the determined path metric of the received first path computation;
means for receiving the computed subsequent path computation between the first and second BNs that exceeds the minimum metric-value; and
means for advertising to other domains, path computations based on the computed subsequent path computation between the first and second BNs that exceed the minimum metric-value.

15. The node according to claim 14, wherein the determined path metric is the delay calculated between the first BN and the second BN.

16. The node according to claim 14, wherein the first and second messages are Path Computation Request, PCReq, messages using PCE Communication Protocol, PCEP.

17. The node according to claim 14, further comprising means for receiving a request for provisioning a multi-domain connection by a PCC from a second domain.

18. The node according to claim 14, further comprising a BN Path Table, BNPT, for storing actual inter-domain resources.

19. The node according to claim 14, wherein the means for advertising path computations includes a Virtual BNPT, V-BNPT, to advertise the path computations to other domains.

* * * * *

UNITED STATES PATENT AND TRADEMARK OFFICE
CERTIFICATE OF CORRECTION

PATENT NO. : 8,644,325 B2  
APPLICATION NO. : 13/394220  
DATED : February 4, 2014  
INVENTOR(S) : Iovanna et al.

Page 1 of 1

It is certified that error appears in the above-identified patent and that said Letters Patent is hereby corrected as shown below:

In the Specification:

In Column 4, Line 61, delete "(BNPT) 212," and insert -- (BNPT) 214, --, therefor.

In Column 4, Lines 61-62, delete "Virtual BNPT (V-BNPT) 214," and insert -- Virtual BNPT (V-BNPT) 212, --, therefor.

In Column 4, Line 67, delete "V-BNPT 214" and insert -- V-BNPT 212 --, therefor.

In Column 7, Line 12, delete "infra-domain" and insert -- intra-domain --, therefor.

Signed and Sealed this  
Fifteenth Day of July, 2014

Michelle K. Lee  
*Deputy Director of the United States Patent and Trademark Office*